(12) United States Patent
Marx et al.

(10) Patent No.: US 11,637,340 B2
(45) Date of Patent: Apr. 25, 2023

(54) TEMPERATURE CONTROL FOR A BATTERY MODULE AND METHOD FOR OPERATING SUCH

(71) Applicant: Robert Bosch GmbH, Stuttgart (DE)

(72) Inventors: Roman Marx, Moensheim (DE); Benjamin Kopp, Remseck am Neckar (DE); Markus Schmitt, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/205,439

(22) Filed: Mar. 18, 2021

(65) Prior Publication Data

US 2021/0296722 A1 Sep. 23, 2021

(30) Foreign Application Priority Data

Mar. 20, 2020 (DE) ..................... 10 2020 203 649.7

(51) Int. Cl.
*H01M 10/6572* (2014.01)
*H01M 50/204* (2021.01)
*H01M 10/6554* (2014.01)
*H01M 10/6567* (2014.01)
*H01M 10/613* (2014.01)

(52) U.S. Cl.
CPC ..... *H01M 10/6572* (2015.04); *H01M 10/613* (2015.04); *H01M 10/6554* (2015.04); *H01M 10/6567* (2015.04); *H01M 50/204* (2021.01)

(58) Field of Classification Search
CPC .......... H01M 10/6572; H01M 10/613; H01M 10/6554; H01M 10/6567; H01M 50/24
See application file for complete search history.

(56) References Cited

U.S. PATENT DOCUMENTS

2006/0028182 A1* 2/2006 Yang .................. H01M 10/633
320/150
2016/0351978 A1* 12/2016 Nishimura .......... H01M 10/613

FOREIGN PATENT DOCUMENTS

| CN | 109980317 A | * | 7/2019 | .......... H01M 10/486 |
| DE | 102010028728 A1 | | 11/2011 | |
| DE | 102011004721 A1 | | 8/2012 | |
| DE | 102016225508 A1 | | 6/2018 | |
| DE | 102018220488 A1 | | 5/2020 | |

(Continued)

*Primary Examiner* — Jimmy Vo
(74) *Attorney, Agent, or Firm* — Michael Best & Friedrich LLP (57) ABSTRACT

A battery module with a plurality of battery cells is disclosed, comprising a first temperature control member and second temperature control member, which are connected together directly thermally conductively in places, wherein the plurality of battery cells is connected directly thermally conductively with the second temperature control member and at least one switchably configured Peltier element connected thermally conductively with the first temperature control member and the second temperature control member is arranged between the first temperature control member and the second temperature control member, wherein a control device is configured to drive the at least one Peltier element in such a way that, when switched on, the at least one Peltier element transfers heat from the second temperature control member to the first temperature control member or heat from the first temperature control member to the second temperature control member.

13 Claims, 3 Drawing Sheets

(56) References Cited

FOREIGN PATENT DOCUMENTS

DE      102019205388 A1    10/2020
EP           2567424 B1     8/2015
WO     WO-2011138156 A1 *  11/2011   ............. H01G 11/72

* cited by examiner

TEMPERATURE CONTROL FOR A BATTERY MODULE AND METHOD FOR OPERATING SUCH

BACKGROUND

The invention is based on a battery module. The present invention also provides a method for operating such a battery module.

It is known from the prior art that a battery module has a plurality of individual battery cells, each of which has a positive voltage tap and a negative voltage tap, wherein, to achieve an electrically conductive serial and/or parallel connection of the plurality of battery cells, the respective voltage taps are connected electrically conductively together and thus interconnected to yield the battery module. Battery modules are in turn interconnected to form batteries or battery systems. Owing to the wide range of possible different vehicle installation spaces, variable module sizes are sought, so as to be able optimally to utilize the available installation space.

Furthermore, the battery cells of a battery module, such as for example lithium-ion battery cells or lithium polymer battery cells, heat up during operation due to chemical transformation processes and due to their electrical resistance during power output or power intake. These processes are relatively pronounced in particular during relatively rapid energy output or energy intake. The more powerful a battery or a battery module is, the more pronounced also is the heating that occurs and thus concomitantly the requirements placed on an efficient temperature control system. To increase the safety of a battery module and also the performance of the battery cells, the battery cells of a battery module need to be heatable and coolable, in order to be able to operate them as far as possible within a given temperature range, so as for example to be able to prevent significant aging or decomposition of the cell chemistry. Predominantly, however, the battery cells need cooling.

Temperature control, i.e. heating of or heat dissipation from the battery may, for example, take the form of liquid temperature control using a water/glycol mixture. In this case, this mixture is passed through cooling plates arranged under the battery module. The cooling plate may in this case be connected to a corresponding component of a cooling circuit.

SUMMARY

A battery module having the features of the independent claim offers the advantage that reliable temperature control of the battery module can be provided.

To this end, a battery module is provided according to the invention.

The battery module has a plurality of battery cells, which take the form in particular of lithium-ion battery cells or of lithium polymer battery cells.

The battery module further comprises a first temperature control member and a second temperature control member. In this case, the first temperature control member and the second temperature control member are connected together directly thermally conductively in places. Furthermore, the plurality of battery cells are connected directly thermally conductively with the second temperature control member.

Between the first temperature control member and the second temperature control member at least one switchably configured Peltier element is arranged, which is connected thermally conductively to the first temperature control member and the second temperature control member.

In this case, the battery module comprises a control device, which is configured to drive the at least one Peltier element in such a way that, when switched on, the at least one Peltier element transfers heat from the second temperature control member to the first temperature control member or transfers heat from the first temperature control member to the second temperature control member.

The measures listed in the dependent claims make possible advantageous further developments of and improvements to the device indicated in the independent claim.

Overall, therefore, it is possible for the at least one Peltier element to assist in temperature control, i.e. heating or cooling of the plurality of battery cells.

Connected thermally conductively together should be understood to mean that a connection is provided which ensures reliable heat transfer.

Peltier elements are those elements known from the prior art which may transfer heat in a given direction, for example even contrary to an existing temperature gradient, using electrical energy. In other words, Peltier elements may transfer heat for example even from a colder side to a warmer side contrary to the natural direction of heat transfer.

A battery module according to the invention thus offers the advantage that temperature control of the plurality of battery cells can be reliably provided.

Cooling may for example proceed by transfer of heat from the plurality of battery cells to the second temperature control member and from the second temperature control member to the first temperature control member. Should the temperature gradient between the first temperature control member and the second temperature control member be insufficient, the Peltier element may provide assistance.

Heating may for example proceed by transfer of heat from the first temperature control member to the second temperature control member and from the second temperature control member to the plurality of battery cells. Should the temperature gradient between the first temperature control member and the second temperature control member be insufficient, the Peltier element may provide assistance.

It is particularly advantageous for temperature control to be possible which may be adapted as a function of the respective ambient conditions. The at least one Peltier element may provide assistance if sufficient temperature control cannot be provided.

At this point, it should be noted that a heat conduction path independent of the Peltier element is formed by the direct thermally conductive connection between the first temperature control member and the second temperature control member. In this way, a thermal path is formed which does not lead via the at least one Peltier element, so impairing the efficiency of the temperature control if the Peltier element is not switched on.

It should moreover be noted that the first temperature control member forms the interface to the environment surrounding the battery module, for example in particular a heat sink or heating plate.

In particular, it is possible to arrange the first temperature control member outside a housing of the battery module and/or the second temperature control member within a housing of the battery module.

It is particularly advantageous that a wide range of design options are available in relation to the installation space.

In particular, the Peltier element is switched to cooling if the first temperature control member has a higher temperature than the second temperature control member or if sufficient temperature control cannot be provided overall.

According to one preferred aspect of the invention, the first temperature control member has a first temperature control compartment formed so that temperature control fluid can flow through it. The temperature control fluid is preferably a temperature control liquid. This offers the advantage that heat can be supplied and dissipated relatively reliably and quickly.

At this point it should be noted that the first temperature control member is preferably made from a metallic material. In this way, the first temperature control member may distribute heat uniformly over the entire first temperature control member.

According to a further preferred aspect of the invention, the second temperature control member has a second temperature control compartment formed so that temperature control fluid can flow through it. The temperature control fluid is preferably a temperature control liquid. This offers the advantage that heat can be supplied and dissipated relatively reliably and quickly.

It is furthermore preferred for a region through which temperature control fluid cannot flow to be connected directly thermally conductively with the at least one Peltier element. This makes it possible to provide reliable heat transfer between the at least one Peltier element and the second temperature control member which is independent of the through-flow of temperature control fluid.

According to the further preferred aspect of the invention, the battery module conveniently has a valve element which regulates flow through the second temperature control compartment.

The valve element is configured such that, when closed, the valve element closes an inlet of the second flow compartment and thus prevents flow through the second temperature control compartment.

The valve element is in this case furthermore configured such that, when open, the valve element opens the inlet of the second flow compartment and thus enables flow through the second temperature control compartment. The control device of the battery module is in this case moreover designed to drive the valve element. In particular, the control device of the battery module is configured to control the valve element in such a way that the valve element prevents flow through the second temperature control compartment if the first temperature control member is at a higher temperature than the second temperature control member. The control device may preferably also control the valve element as a function of the temperature of the temperature control fluid.

This makes it possible reliably to assist temperature control of the plurality of battery cells. In particular, for cooling purposes heat may be transferred from the plurality of battery cells to the second temperature control member. This heat may be transferred from the second temperature control member to the temperature control fluid flowing through the second temperature control compartment or from the second temperature control member to the first temperature control member. The at least one Peltier element may assist in this heat transfer process. The Peltier element preferably provides assistance when the second temperature control compartment is closed by the valve element.

It is particularly convenient for the control device to control the at least one Peltier element and the valve device in such a way that, for cooling purposes, the at least one Peltier element is arranged in a switched-on state when the valve element is arranged in a closed state.

At this point it should be noted that the second temperature control member is preferably made from a metallic material. In this way, the second temperature control member may on the one hand relatively reliably transfer heat between the plurality of battery cells and the first temperature control member or the at least one Peltier element and on the other hand also distribute heat uniformly over the entire second temperature control member.

The first temperature control compartment and the second temperature control compartment are preferably connected in a fluid-conducting manner. In this way, a closed circuit may be formed for the temperature control fluid.

In this case, it is particularly convenient for the first temperature control compartment to form a first flow compartment and a second flow compartment, which are separated in flow-conducting manner from one another. An inlet of the first flow compartment is in this case connected in flow-conducting manner with an outlet of the second temperature control compartment. In other words, this means that, after flowing through the second temperature control compartment, the temperature control fluid can flow through the first flow compartment of the first temperature control compartment.

This offers the advantage that temperature control fluid flowing into the battery module can be conducted in different ways by the control device as a function of temperature control requirements.

The control device may for example drive the valve element in such a way that the latter is opened, such that the temperature control fluid firstly flows through the second temperature control compartment and then out of the second temperature control compartment into the first flow compartment of the first temperature control compartment. Once it has flowed through the first flow compartment the temperature control fluid leaves the battery module. This is advantageous if the temperature of the temperature control fluid is sufficient reliably to supply heat to or dissipate heat from the plurality of battery cells. For example, the temperature control fluid has a sufficiently low temperature reliably to cool the plurality of battery cells.

The control device may for example drive the valve element in such a way that the latter is closed, such that the temperature control fluid flows through the second flow compartment of the first temperature control compartment. Once it has flowed through the second flow compartment the temperature control fluid leaves the battery module. This is advantageous if the temperature of the temperature control fluid is insufficient reliably to supply heat to or dissipate heat from the plurality of battery cells. For example, the temperature control fluid has an insufficiently low temperature to cool the plurality of battery cells reliably, in particular reliable direct cooling is not possible. In this case, there is no flow through the second temperature control compartment. The valve element is closed. Furthermore, the Peltier element is switched on and assists in heat transfer to the first temperature control member, through which temperature control fluid flows.

It is thus possible to allow relatively efficient temperature control of the battery module by switching over between two temperature control options as a function of the prevailing ambient conditions.

In particular, it is possible to match the two described temperature control options purposefully to the respective requirements and optimize them. Temperature control may thus in this case be provided by cooling or heating by means of a temperature control fluid, wherein assistance may be provided by the at least one Peltier element.

According to one preferred aspect of the invention, the battery module comprises a housing, which at least in part forms the first temperature control member. The housing may in this respect accommodate the plurality of battery cells in an internal compartment. For example, the housing of the battery module may be embodied as a die cast component. On a side facing away from the internal compartment accommodating the plurality of battery cells, the housing may for example form a temperature control structure. A cover element defines the first temperature control compartment in such a way that the temperature control structure is arranged in the first temperature control compartment. The first temperature control member, and in particular the temperature control structure of the first temperature control compartment are integrated into the housing of the battery module. This offers the advantage, in particular, that components of the temperature control compartment conveying temperature control fluid are arranged outside the internal compartment, such that in the event of leaks no temperature control fluid can pass from the first temperature control compartment to the battery cells, whereby safety may be increased.

The second temperature control member is in this case arranged in the internal compartment of the battery module. In particular, the second temperature control member may in this case be bonded or form-fittingly connected to the housing.

This makes it possible to provide a relatively compact battery module, in which the first temperature control member and second temperature control member are part of the housing or are arranged inside the housing.

It is particularly preferable for the second temperature control member to comprise two metallic plates, in particular aluminum sheets, bonded together to form the second temperature control compartment.

The second temperature control member may for example be formed using a roll bonding method. To this end, two flat metal sheets, such as for example aluminum sheets, are bonded together by rolling. The second temperature control compartment may in this case be obtained by the application of a release agent between the two metal sheets prior to welding and subsequent inflation using hydraulic pressure. At the points at which the release agent has been applied, the second temperature control compartment forms.

The second temperature control member may for example be formed using a soldering method. To this end, two metal sheets, such as for example aluminum sheets are accordingly deep drawn or stamped and blanked. Then the two metal sheets are soldered together in such a way as to form the second temperature control compartment.

This offers the particular advantage overall that the second temperature control member may be formed such that the regions through which temperature control fluid cannot flow are those regions at which the two metallic plates are bonded together and relatively good heat transfer may thereby be provided between the plurality of battery cells and the at least one Peltier element over the second temperature control member.

The second temperature control member preferably has at least one recess, in which the at least one Peltier element is accommodated. In this way, an overall compact structure may be provided.

Conveniently, at least one first thermally conductive compensating element may be arranged between the first temperature control member and the second temperature control member.

Conveniently, at least one second thermally conductive compensating element may be arranged between the plurality of battery cells and the second temperature control member.

Conveniently, at least one third thermally conductive compensating element may be arranged between the at least one Peltier element and the first temperature control member and/or the second temperature control member.

In this way, direct heat transfer may be improved.

The present invention also provides methods for operating a battery module as just described. In this respect, the control device drives the at least one Peltier element and arranges the at least one Peltier element in a switched-on state when the magnitude of the temperature difference between the second temperature control member and the first temperature control member lies below a predetermined value. In this way, the at least one Peltier element may efficiently assist in heating and cooling the plurality of battery cells.

BRIEF DESCRIPTION OF THE DRAWINGS

Exemplary embodiments of the invention are explained in more detail in the following description and illustrated in the drawings, in which:

FIG. 3b is a perspective view from below of the second temperature control member according to FIG. 3a.

DETAILED DESCRIPTION

Figure 1:
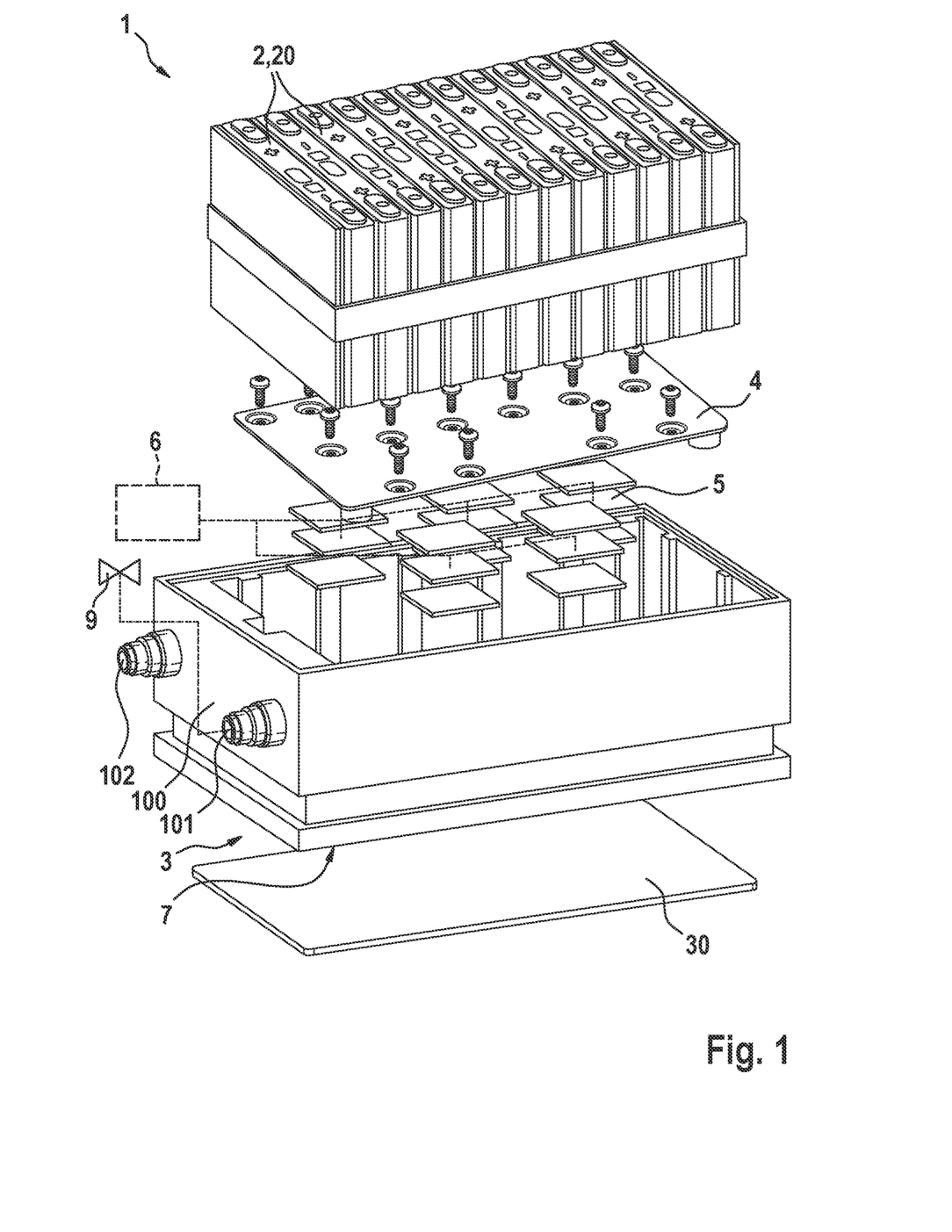
FIG. 1 is a perspective view, in an exploded representation, of an embodiment according to the invention of a battery module.

FIG. 1 is a perspective view, in an exploded representation, of an embodiment according to the invention of a battery module 1.

The battery module 1 has a plurality of battery cells 2 which take the form in particular of lithium-ion battery cells 20. The plurality of battery cells 2 may for example each be prismatic in configuration and in addition be mechanically fastened together.

The battery module 1 further comprises a housing 100. The plurality of battery cells 2 are in this case accommodated in the housing 100, for example.

The battery module 1 in this case comprises a first temperature control member 3 and a second temperature control member 4. The first temperature control member 3 and the second temperature control member 4 are in this case connected directly thermally conductively together in places.

In addition, the plurality of battery cells 2 are connected directly thermally conductively to the second temperature control member 4.

A plurality of Peltier elements 5 are arranged between the first temperature control member 3 and the second temperature control member 4. The Peltier elements 5 are in this case of switchable configuration and connected thermally conductively with the first temperature control member 3 and the second temperature control member 4. When switched on, a Peltier element 5 may transfer heat in a given direction and for example also contrary to an existing temperature gradient.

Furthermore, the battery module 1 comprises a control device 6. This control device 6 is in this case configured to drive the Peltier element 5. In particular, the control device 6 is configured to place the Peltier element 5 in a switched-on state when the magnitude of the temperature difference between the second temperature control member 4 and the first temperature control member 3 lies below a predetermined value. Then, the Peltier element 5 may assist in heat transfer.

At this point it should be noted that the housing 100 at least in part forms the first temperature control member 3. A cover element 30 defines a first temperature control compartment 7 of the first temperature control member 3.

Figure 2A:
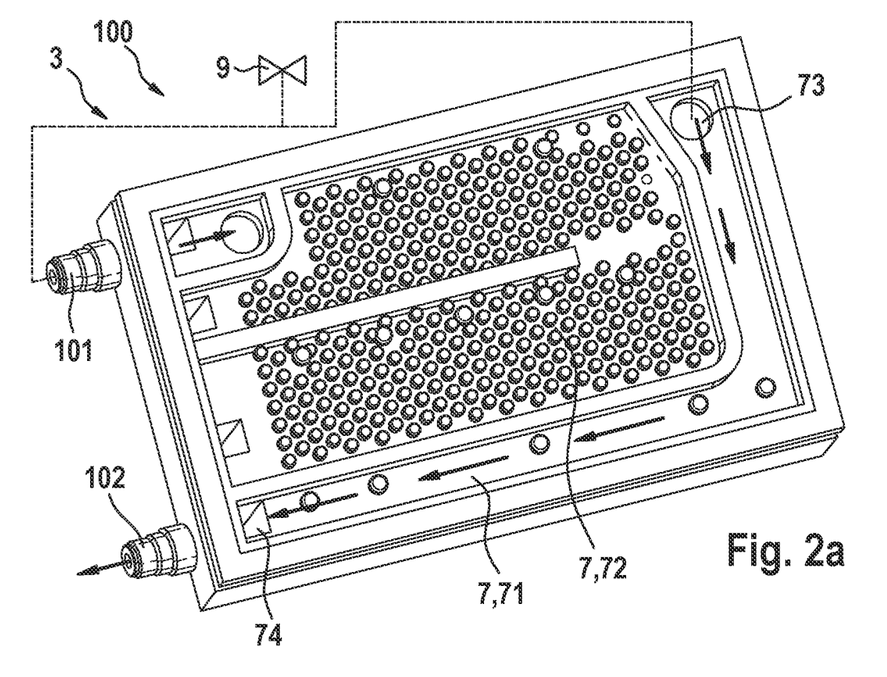
FIG. 2a is a perspective view from below of the housing of the battery module with through-flow through a first flow compartment.
Figure 2B:
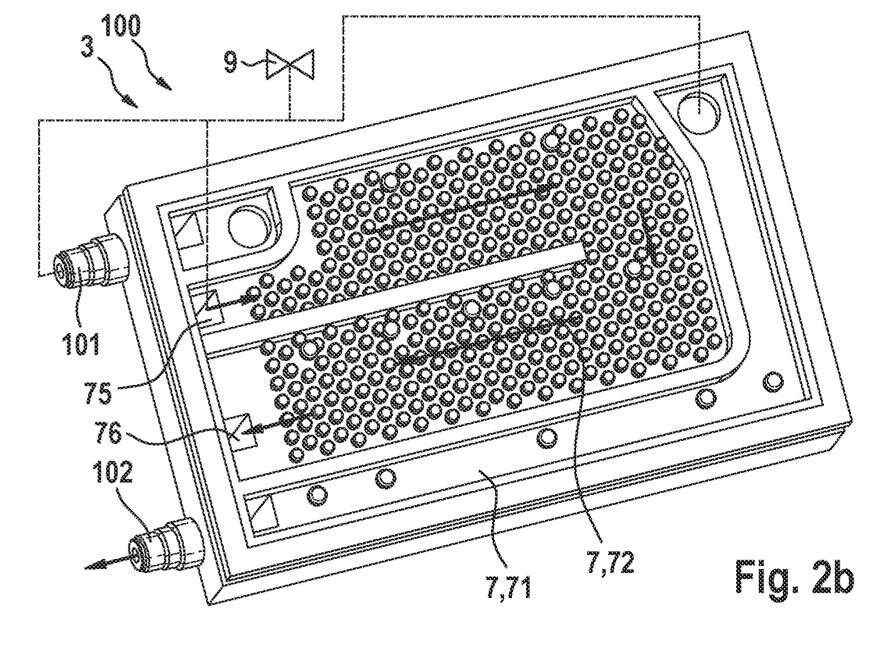
FIG. 2b is a perspective view from below of the housing of the battery module with through-flow through a second flow compartment.

FIG. 2a is a perspective view from below of the housing 100 of the battery module 1 with through-flow through a first flow compartment 71. FIG. 2b is perspective view from below of the housing 100 of the battery module 1 with through-flow through a second flow compartment 72.

Firstly, it is apparent from FIGS. 2a and 2b that the first temperature control member 3 has a first temperature control compartment 7 configured for flow through by temperature control fluid, such as for example a temperature control liquid. It is additionally apparent that the first temperature control compartment 7 has a first flow compartment 71 and a second flow compartment 72. The first flow compartment 71 and the second flow compartment 72 are in this case separated in flow-conducting manner from one another.

The arrows in FIG. 2a indicate through-flow through the first flow compartment 71.

The arrows in FIG. 2b indicate through-flow through the second flow compartment 72.

It is in particular apparent that these two through-flows are mutually independent and that the first temperature control compartment 71 and the second temperature control compartment 72 are separated fluid-tightly from one another.

The first flow compartment 71 in this case has a first inlet 73 and a first outlet 74. Furthermore, the second flow compartment 72 has a second inlet 75 and a second outlet 76.

Figure 3A:
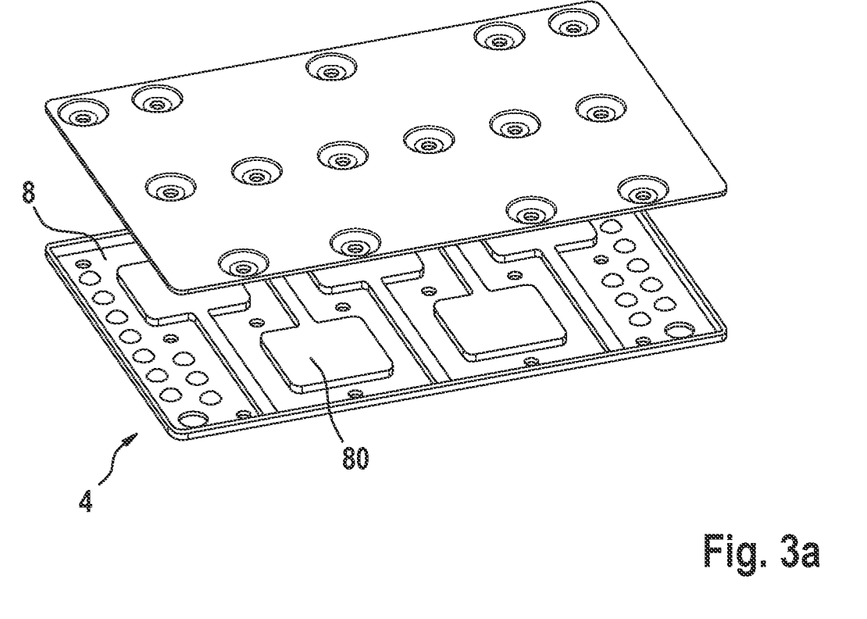
FIG. 3a is a perspective view, in an exploded representation, of a representation of a second temperature control member of a battery module according to the invention.
Figure 3B:
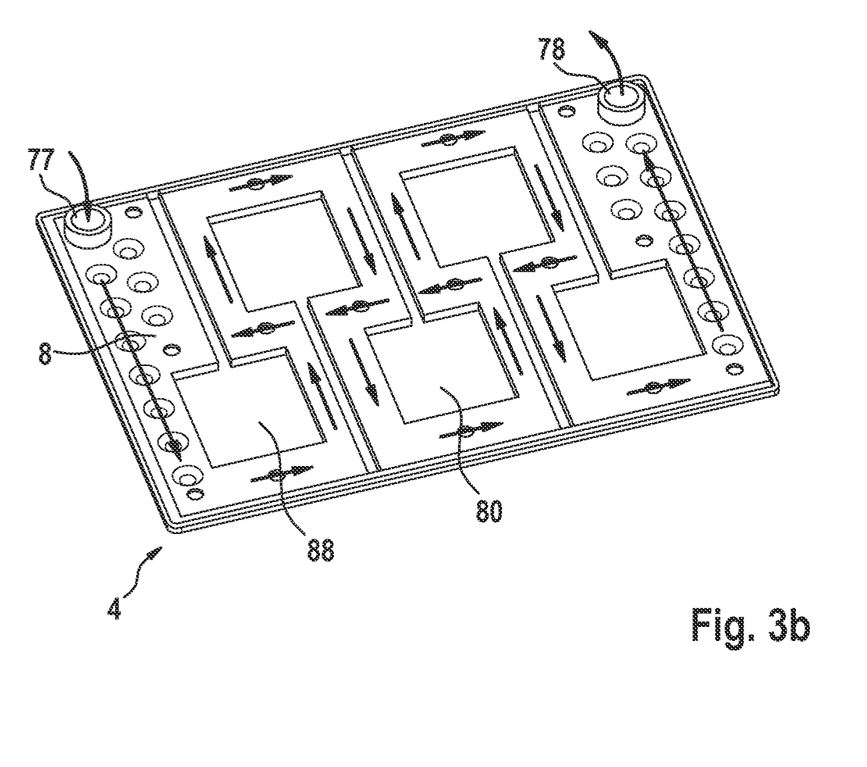

FIG. 3a is a perspective view, in an exploded representation, of a representation of a second temperature control member 4 of a battery module 1 according to the invention. FIG. 3b is a perspective view from below of the second temperature control member 4 according to FIG. 3a.

The second temperature control member 4 in this case has a second temperature control compartment 8 configured such that temperature control fluid, such as for example a temperature control liquid, can flow through it. Furthermore, the second temperature control member 4 comprises a region 80 through which temperature control fluid cannot flow which is directly thermally conductively connectable with a Peltier element 5.

Furthermore, a flow route in the second temperature control compartment 8 of the second temperature control member 4 is indicated by arrows. This flow route is here distributed uniformly over the second temperature control member 4. In particular, it is apparent that the regions 80 do not have temperature control fluid flowing through them.

The second temperature control compartment in this case has a third inlet 77 and a third outlet 78.

The third outlet 78 of the second temperature control compartment 8 is in this case connected in flow-conducting manner with the first inlet 73 of the first flow compartment 71 of the first temperature control compartment 7. In this way temperature control fluid, once it has flowed through the second temperature control compartment 8 may flow into and through the first flow compartment 71.

Furthermore, the housing 100 of the battery module 1, as is apparent in FIG. 1, comprises a fourth inlet 101 and a fourth outlet 102.

The fourth inlet 101 of the housing 100 of the battery module 1 is in this case connected in flow-conducting manner both with the second inlet 75 of the second flow compartment 72 of the first temperature control compartment 7 and with the third inlet 77 of the second temperature control compartment 8.

Furthermore, the battery module 1 comprises a valve element 9, which regulates through-flow of the second temperature control compartment 8. In particular, the valve element 9 may be arranged in two states. In a first state, the inlet 75 of the second flow compartment 72 is closed and the inlet 77 of the second temperature control compartment 8 is open. In a second state, the inlet 75 of the second flow compartment 72 is open and the inlet 77 of the second temperature control compartment 8 is closed. The control device 6 is configured to drive the valve element 9 and arrange it in the first state or in the second state.

The fourth outlet 102 of the housing 100 of the battery module 1 is here connected in flow-conducting manner both with the second outlet 76 of the second flow compartment 72 of the first temperature control compartment 7 and with the first outlet 74 of the first flow compartment 71 of the first temperature control compartment 7.

If the valve element 9 is arranged in the first state, temperature control fluid flowing in through the fourth inlet 101 of the housing 100 of the battery module 1 cannot flow into the second flow compartment 72 but rather only through the third inlet 77 into the second temperature control compartment 8. Once it has flowed through the second temperature control compartment 8, the temperature control fluid may flow through the third outlet 78 from the second temperature control compartment 8 into the first flow compartment 71 of the first temperature control compartment 7. Once it has flowed through the first flow compartment 71 of the first temperature control compartment 7, the temperature control fluid may leave the battery module through the outlet 102 of the housing 100 of the battery module 1.

If the valve element 9 is arranged in the second state, temperature control fluid flowing in through the fourth inlet 101 of the housing 100 of the battery module 1 can flow into the second flow compartment 72 but not through the third inlet 77 into the second temperature control compartment 8.

Once it has flowed through the second flow compartment 72 of the first temperature control compartment 7, the temperature control fluid may leave the battery module through the outlet 102 of the housing 100 of the battery module 1.

The control device 6 can then drive the valve element 9 in such a way that the valve element 9 is arranged in the first state if for example a temperature of the temperature control fluid is sufficient to provide temperature control. If this temperature is insufficient, the control device 6 may drive the valve element 9 in such a way that the valve element 9 is arranged in the second state and additionally switches on the Peltier element 5.

In this way, both reliable heating and also cooling of the plurality of battery cells may be provided.

At this point it should be noted that such driving is naturally also possible during ongoing operation. In particular, the control device 6 controls the valve element 9 as a function of the temperatures of the first temperature control member and the second temperature control member.

If for example the first temperature control member 3 exhibits a higher temperature than the second temperature control member 4, cooling solely by through-flow for example using the temperature control liquid is insufficient and additional assistance from the Peltier elements 5 is needed.

The second temperature control member 4 may have recesses 88 in which the Peltier elements 5 can be accommodated.

What is claimed is:

1. A battery module with a plurality of battery cells (2), the battery module comprising:
a first temperature control member (3) and second temperature control member (4), which are connected together directly thermally conductively in places, wherein the plurality of battery cells (2) is connected directly thermally conductively with the second temperature control member (4), and at least one switchably configured Peltier element (5), which is connected thermally conductively with the first temperature control member (3) and the second temperature control member (4), is arranged between the first temperature control member (3) and the second temperature control member (4),
characterized in that
a control device (6) is configured to, depending on ambient conditions of the plurality of battery cells (2), drive the at least one Peltier element (5) in such a way that, when switched on, the at least one Peltier element (5) (i) transfers heat from the second temperature control member (4) to the first temperature control member (3) when the ambient conditions are in a first state and (ii) transfers heat from the first temperature control member (3) to the second temperature control member (4) when the ambient conditions are in a second state,
wherein the second temperature control member (4) has at least one recess (88),
wherein the at least one recess (88) has a first portion in which the at least one Peltier element (5) is accommodated, and
wherein the at least one recess (88) has a second portion that extends from the first portion to a sidewall of the second temperature control member (4).

2. The battery module according to preceding claim 1, characterized in that
the first temperature control member (3) has a first temperature control compartment (7) configured for flow through by temperature control fluid.

3. The battery module according to claim 1, characterized in that
the second temperature control member (4) has a second temperature control compartment (8) configured such that temperature control fluid can flow through the second temperature control compartment (8), and the at least one recess (88) defines a region (80) through which temperature control fluid cannot flow, the region (80) being connected directly thermally conductively with the at least one Peltier element (5).

4. The battery module according to preceding claim 3, characterized in that
the battery module (1) has a valve element (9) which regulates flow through the second temperature control compartment (8),
the control device (6) is further configured to drive the valve element (9) in such a way that, when closed, the valve element (9) prevents flow through the second temperature control compartment (8) and, when open, allows flow through the second temperature control compartment (8).

5. The battery module according to claim 2,
characterized in that
the first temperature control compartment (7) and the second temperature control compartment (8) are connected in a fluid conducting manner.

6. The battery module according to claim 5,
characterized in that
the first temperature control compartment (7) forms a first flow compartment (71) and a second flow compartment (72), which are separated in flow-conducting manner, wherein an inlet (73) of the first flow compartment (71) is connected in flow-conducting manner with an outlet (78) of the second temperature control compartment (8).

7. The battery module according to claim 1,
characterized in that
the battery module (1) comprises a housing (100), wherein the housing (100) forms the first temperature control member (3) at least in part.

8. The battery module according to claim 3,
characterized in that
the second temperature control member (4) comprises two metallic plates bonded together to form the second temperature control compartment (8).

9. The battery module according to claim 1,
characterized in that
at least one first thermally conductive compensating element is arranged between the first temperature control member (3) and the second temperature control member (4),
at least one second thermally conductive compensating element is arranged between the plurality of battery cells (2) and the second temperature control member (4), and/or
at least one third thermally conductive compensating element is arranged between the at least one Peltier element (5) and the first temperature control member (3) and/or the second temperature control member (4).

10. The battery module according to claim 2,
characterized in that the temperature control fluid is a temperature control liquid.

11. The battery module according to claim 8,
characterized in that the two metallic sheets are aluminum plates.

12. The battery module according to preceding claim 1,
characterized in that
the at least one recess (88) is at least two recesses (88), wherein a first recess of the at least two recesses (88) has the first portion in which the at least one Peltier element (5) is accommodated, and wherein the first recess has the second portion that extends from the first portion of the first recess to the sidewall of the second temperature control member (4),
wherein a second recess of the at least two the recesses (88) has another first portion in which another at least one Peltier element (5) is accommodated, and wherein the second recess has another second portion that extends from the another first portion to a different sidewall of the second temperature control member (4), and
wherein the first recess and the second recess at least in part define a region (80) through which temperature control fluid cannot flow.

13. A method for operating a battery module (1) according to claim 1, characterized in that the control device (6) drives the at least one Peltier element (5) and arranges the at least one Peltier element (5) in a switched-on state when a magnitude of a temperature difference between the second temperature control member (4) and the first temperature control member (3) lies below a predetermined value.

\* \* \* \* \*